United States Patent
Rust (10) Patent No.: US 9,446,483 B2
(45) Date of Patent: Sep. 20, 2016

(54) DUAL WALLED TITANIUM TUBING AND METHODS OF MANUFACTURING THE TUBING

(71) Applicant: The Boeing Company, Chicago, IL (US)

(72) Inventor: Charles William Rust, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/619,449

(22) Filed: Feb. 11, 2015

(65) Prior Publication Data

US 2016/0228997 A1    Aug. 11, 2016

(51) Int. Cl.
*B23K 5/02* (2006.01)
*B23K 101/04* (2006.01)
*F16L 7/00* (2006.01)
(Continued)

(52) U.S. Cl.
CPC .......... *B23K 31/027* (2013.01); *B21D 26/051* (2013.01); *B21D 26/055* (2013.01); *B23K 20/02* (2013.01); *B23K 26/282* (2015.10); *F16L 9/02* (2013.01); *F16L 9/18* (2013.01)

(58) Field of Classification Search
CPC ... F16L 9/18; F16L 39/005; Y10T 29/49879; Y10T 29/49826; Y10T 29/49361; Y10T 29/49828; B21C 37/154; F28D 7/106; F28F 1/003; F28F 1/06; F28F 1/42; F28F 1/426; B23K 2203/14; B23K 26/282
USPC ........ 228/157, 193; 138/148, 151, 113, 147; 285/123.15, 123.1, 21.2; 29/455.1, 428
See application file for complete search history.

(56) References Cited

U.S. PATENT DOCUMENTS 3,927,817 A    12/1975   Hamilton et al.
5,143,276 A *   9/1992   Mansbridge ......... B21D 26/055
                                                     228/157
(Continued)

FOREIGN PATENT DOCUMENTS

CN    103 008 998    4/2013
ES       2181512    2/2003
(Continued)

OTHER PUBLICATIONS

Co-Pending U.S. Appl. No. 14/530,826, filed Nov. 2, 2014 entitled "Integrated Individual Induction Coils for Processing Large Work Pieces".

(Continued)

*Primary Examiner* — Erin Saad
(74) *Attorney, Agent, or Firm* — McDonnell Boehnen Hulbert & Berghoff LLP (57) ABSTRACT

Within examples, a method of manufacturing a double-walled titanium conduit is described. Example methods include stitch welding multiple concentric sheets to form a stitch layer, providing the stitch layer between an inner wall and an outer wall of the double-walled titanium conduit, circumferentially seam welding the inner wall and the outer wall to the stitch layer to create a welded assembly, die forming the welded assembly at temperature and pressure to form inner structures between the multiple concentric sheets according to stitch welding lines and to enable a diffusion bond process among the inner wall, the stitch layer, and the outer wall, and removing the double-walled titanium conduit from the die.

20 Claims, 7 Drawing Sheets

(51) Int. Cl.
*B23K 31/02* (2006.01)
*F16L 9/02* (2006.01)
*F16L 9/18* (2006.01)
*B21D 26/051* (2011.01)
*B21D 26/055* (2011.01)
*B23K 20/02* (2006.01)

(56) References Cited

U.S. PATENT DOCUMENTS

| | | |
|---|---|---|
| 5,214,948 A | 6/1993 | Sanders et al. |
| 5,410,132 A | 4/1995 | Gregg et al. |
| 5,420,400 A | 5/1995 | Matsen |
| 5,599,472 A | 2/1997 | Brown et al. |
| 5,641,422 A | 6/1997 | Matsen et al. |
| 5,645,744 A | 7/1997 | Matsen et al. |
| 5,645,747 A | 7/1997 | Matsen et al. |
| 5,683,608 A | 11/1997 | Matsen et al. |
| 5,687,900 A * | 11/1997 | Zaccone ............ B21D 26/055 228/173.6 |
| 5,700,995 A | 12/1997 | Matsen |
| 5,728,309 A | 3/1998 | Matsen et al. |
| 5,821,506 A | 10/1998 | Matsen |
| 6,211,497 B1 | 4/2001 | Matsen et al. |
| 6,528,771 B1 | 3/2003 | Matsen et al. |
| 6,566,635 B1 | 5/2003 | Matsen et al. |
| 6,612,020 B2 | 9/2003 | Sanders |
| 6,855,917 B2 | 2/2005 | Matsen et al. |
| 6,897,419 B1 | 5/2005 | Brown et al. |
| 6,914,225 B2 | 7/2005 | Fischer et al. |
| 7,533,794 B2 | 5/2009 | Comley et al. |
| 8,884,201 B2 | 11/2014 | Matsen et al. |
| 2013/0082047 A1 | 4/2013 | Matsen et al. |
| 2013/0134154 A1 | 5/2013 | Matsen et al. |

FOREIGN PATENT DOCUMENTS

| | | |
|---|---|---|
| JP | 2004245115 | 9/2004 |
| WO | 2012/081927 | 6/2012 |

OTHER PUBLICATIONS

Co-Pending U.S. Appl. No. 14/599,475, filed Jan. 17, 2015 entitled "Frequency Variation to Expand Smart Susceptor Control Range". (Divisional of US Publication No. 2013/0134154) A1).

* cited by examiner

DUAL WALLED TITANIUM TUBING AND METHODS OF MANUFACTURING THE TUBING

FIELD

The present disclosure relates generally to super plastically forming and diffusion bonding a titanium dual walled tubing, and more specifically to a double walled titanium tube that has an inner wall and an outer wall with at least one stiffener extending from the inner wall to the outer wall.

BACKGROUND

Tubing and duct systems for conveying fluids are in widespread use in many industries. In the aerospace industry, for example, welded ducts are used in environmental control systems and in wing de-icing systems for conveying heated air from the engine to leading edges and nacelle inlet nose to prevent ice from forming on those surfaces in icing conditions in flight. Tubing, of course, may be utilized in many other industries as well including the oil industry or other industries in which transport elements are required for use in extreme environments at times.

Tubing materials may be manufactured using superplastic forming (SPF) and diffusion bonding (DB) techniques. For many years it has been known that certain metals, such as titanium and many of its alloys, exhibit superplasticity. Superplasticity is the capability of a material to develop unusually high tensile elongations with reduced tendency toward necking This capability is exhibited by a few metals and alloys and within a limited temperature and strain rate range. Titanium and titanium alloys have been observed to exhibit superplastic characteristics equal to or greater than those of any other metals. With suitable titanium alloys, overall increase in surface areas up to 300% are possible, for example. Advantages of superplastic forming are numerous including abilities to create complex shapes and deep drawn parts, and low deformation stresses are required to form the metal at the superplastic temperature range thereby permitting forming of parts under low pressures that minimize tool deformation and wear.

Diffusion bonding (DB) refers to metallurgical joining of surfaces of similar or dissimilar metals by applying heat and pressure for a time duration so as to cause co-mingling of atoms at the joint interface. Diffusion bonding can be accomplished entirely in the solid-state at or above one-half the base metal melting point (absolute). Actual times, temperatures, and pressures will vary from metal to metal. The joining surfaces are brought within atomic distances by application of pressure. Adequate pressure is provided to cause some plastic flow to fill normal void areas. If pressures are too low, small voids may remain at the joint inter face and the joint strength will be less than the maximum obtainable. The application of pressure also breaks up the surface oxides and surface asperities so as to present clean surfaces for bonding. Elevated temperatures used for diffusion bonding serve the functions of accelerating diffusion of atoms at the joint interfaces and providing a metal softening which aids in surface deformation so as to allow more intimate contact for atom bonding and movement across the joint interface. Elevated temperature and application of pressure also results in diffusion of the surface contaminants into the base metal during bonding which allows metal atom-to-atom bonding and thereby strengthens the bond. Sufficient time is allowed to ensure the strengthening of the bond by diffusion of atoms across the joint interface.

According to existing processes, tubing sheets are manufactured in a flat form, in which one or more superplastically formable metal sheets are placed in a die cavity defined between cooperable dies, the sheets are heated to an elevated temperature at which the sheets exhibit superplasticity, and then a gas is used to apply differential pressures to the opposite sides of the sheets in order to form the sheets. The pressure is selected to strain the material at a strain rate that is within its superplasticity range at the elevated temperature, stretch the sheets, and cause the sheet to assume the shape of the die surface. In this way, the sheets can be formed to a complex shape defined by the dies.

In other existing processes, SPF and DB can be performed in a combined forming/bonding operation. For instance, in one example combined SPF/DB process, three metal sheets are stacked in a flat form to form a pack. A stop-off material is selectively provided between the sheets to prevent portions of the adjacent surfaces of the sheets from being bonded. The pack is heated and compressed in a die cavity with sufficient gas pressure so that the adjacent portions of the sheets that are not treated with the stop-off material are joined by diffusion bonding. Thereafter, a pressurized gas is injected between the sheets to inflate the pack, and thereby superplastically form the pack to a configuration defined by the surface of the die cavity. Such a combined SPF/DB process can be used, e.g., to produce complex honeycomb sandwich structures that are formed and diffusion bonded to define hollow internal cells. Generally, the simplicity of the superplastic forming and/or diffusion bonding processes can result in lighter and less expensive structures with fewer fasteners and higher potential geometric complexity.

However, using existing superplastic forming and diffusion bonding processes results in flat sheets that still require further manufacturing processes to form the sheets into a tubing system, which may alter the bonds created. Using examples described herein, a titanium (or other alloy) double-walled tube can be manufactured using SPF and DB that is corrosion resistant, heat resistant, and structurally reinforced with increased cross section for greater strength than seen in flat sheets to provide a fail safety for a titanium tube.

SUMMARY

In one example, a method of manufacturing a double-walled titanium conduit is described, comprising stitch welding multiple sheets concentrically to form a pack which later forms the inner-to-outer wall stiffeners. A concentric set of inner and outer walls of the double-walled titanium conduit are circumferentially seam welded to the inner stitch welded pack sheets to create a welded assembly, die forming the welded assembly at temperature and pressure to form inner structures between the multiple concentric sheets according to stitch welding lines and to enable a diffusion bond process between the outer wall and the stiffeners, the inner and the stiffeners, and between adjacent stiffeners, and removing the double-walled titanium conduit from the die.

In another example, another method of manufacturing a double-walled tube is described comprising super plastically forming inner structures of the double-walled tube, and diffusion bonding an outer wall, an inner wall and the inner structures of the double-walled tube. The super plastically forming and diffusion bonding comprises arranging substantially intimately concentric seamless tubings, stitch welding the seamless tubings with a rolled tubing seam welder to create a pack which later forms the inner-to-outer wall stiffeners including a stitch pattern, circumferentially seam welding concentric outer sheets of the outer wall to the inner wall and the stitched pack to create a welded tube assembly. The forming process also includes inserting a cylinder die into the welded tube assembly, placing the welded tube assembly into a heated die, bringing the welded tube assembly up to temperature, pressurizing the welded tube assembly to form the inner structures according to the stitch pattern, holding pressure for a diffusion bond process between the outer wall and the inner wall, and removing a resulting tube part from the heated die and cooling the resulting tube part.

In another example, a double-walled titanium tube structure is described comprising an inner wall and an outer wall with a plurality of stiffeners extending between the inner wall to the outer wall, and the plurality of stiffeners are aligned both axially and radially, and the plurality of stiffeners are diffusion bonded to the inner wall and the outer wall.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Within examples, methods and systems for superplastic forming (SPF) and diffusion bonding a double-walled conduit are described. SPF generally refers to a process in which a material is superplastically deformed beyond its normal limits of plastic deformation. Superplastic forming can be performed with certain materials that exhibit superplastic properties within limited ranges of temperature and strain rate. For example, workpieces formed of titanium alloys can be superplastically formed in a temperature range between about 1450° F. and about 1850° F. at a strain rate up to about $3 \times 10^{-4}$ per second. Diffusion bonding (DB) generally refers to a process of joining members using heat and pressure to form a solid-state coalescence between the materials of the joined members. Joining by diffusion bonding can occur at a temperature below a melting point of the materials that are being joined, and the coalescence therebetween may be produced with loads below those that would cause macroscopic deformation of the article.

In example, super plastically forming and diffusion bonding a titanium dual walled tubing can be achieved by to manufacture a double walled titanium tube that has an inner wall and an outer wall with at least one stiffener extending from the inner wall to the outer wall. The tubing may include a plurality of stiffeners aligned axially, and in other examples, the tubing may include a plurality of stiffeners aligned both axially and radially.

An example method of super plastically forming and diffusion bonding the double walled titanium tube includes arranging substantially intimately concentric seamless tubings, cleaning the seamless tubings, and stitch welding the seamless tubings with a rolled tubing seam welder. Following, the method includes circumferentially seam welding outer tubing to inner tubing, including a stitch welded pack, fusion welding pressure lines, and inserting a cylinder die into the tube assembly. The tube assembly can be placed into a heated die and brought up to temperature and pressure that is held for a diffusion bond process to occur over a period of time. A resulting part can be removed from the die and cooled for use or further processing.

Figure 1:
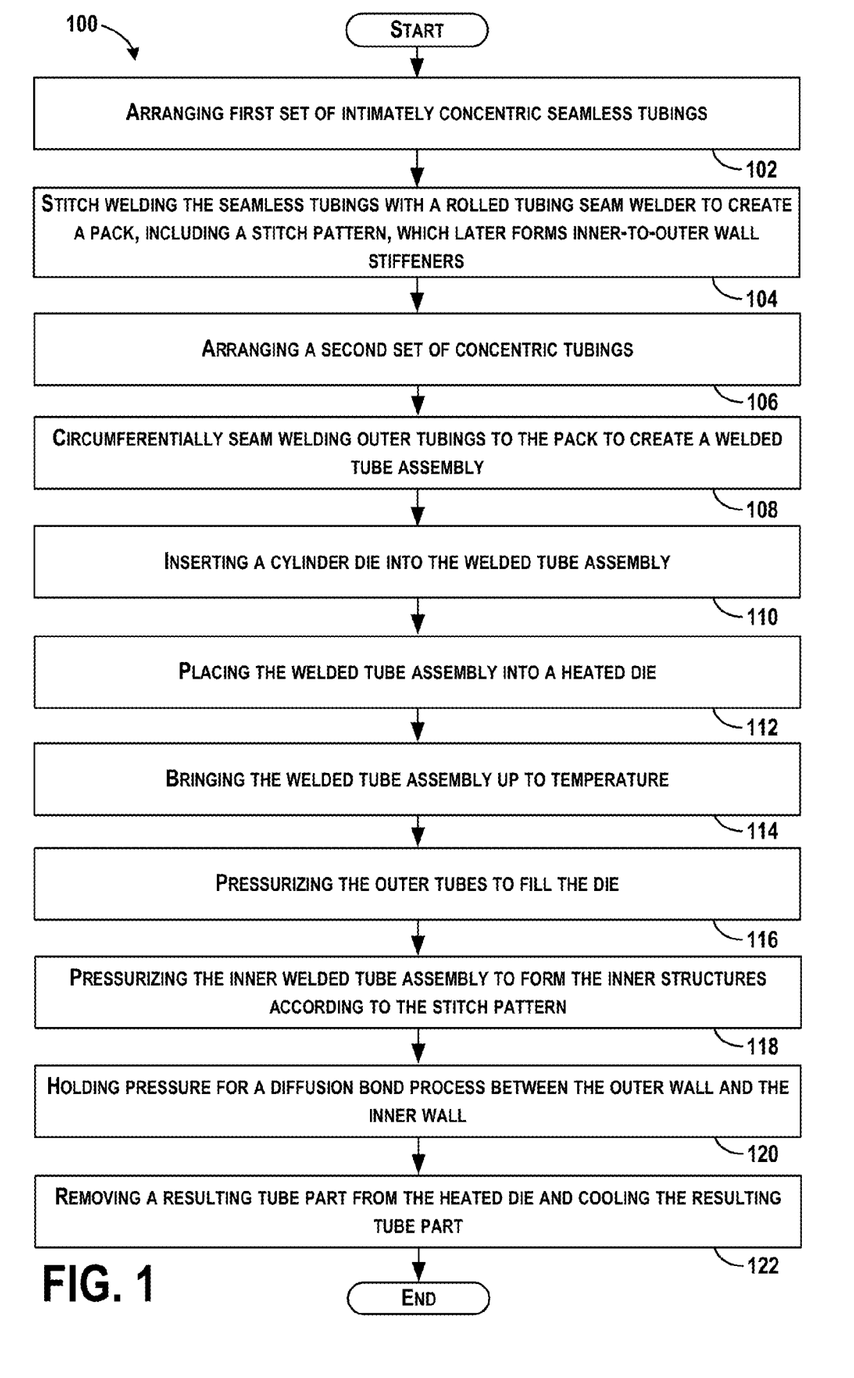
FIG. 1 is a flowchart that describes an example method of manufacturing a double-walled tube by super plastically forming and diffusion bonding an outer wall, an inner wall and inner structures of the double-walled tube.

Referring now to the figures, FIG. 1 is a flowchart that describes an example method 100 of manufacturing a double-walled tube by super plastically forming and diffusion bonding an outer wall, an inner wall and inner structures of the double-walled tube. The outer wall and the inner wall of the tube refer to interior and exterior layers of the tube, which comprises sheets concentrically wound together. The method 100 of super plastically forming and diffusion bonding may include one or more operations, functions, or actions as illustrated by one or more of blocks 102-118. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 102, the method 100 includes arranging a first set of intimately concentric seamless tubings. In some examples, the concentric seamless tubings have approximately matching diameters to enable contact during a stitch welding process. The tubings can be sandwiched together in a circular manner by using a seamless tubing or rolled tubing. In one example, flat sheets of titanium may be arranged together and wound up to form the concentric titanium seamless tubes.

In some examples, the method 100 optionally includes cleaning the seamless tubings to remove oxidation.

At block 104, the method 100 includes stitch welding the seamless tubings with a rolled tubing seam welder to create a pack, including a stitch pattern, which later forms inner-to-outer wall stiffeners. Stitch welding the seamless tubings may create the stitch pattern along a length of the seamless tubings.

Figure 2:
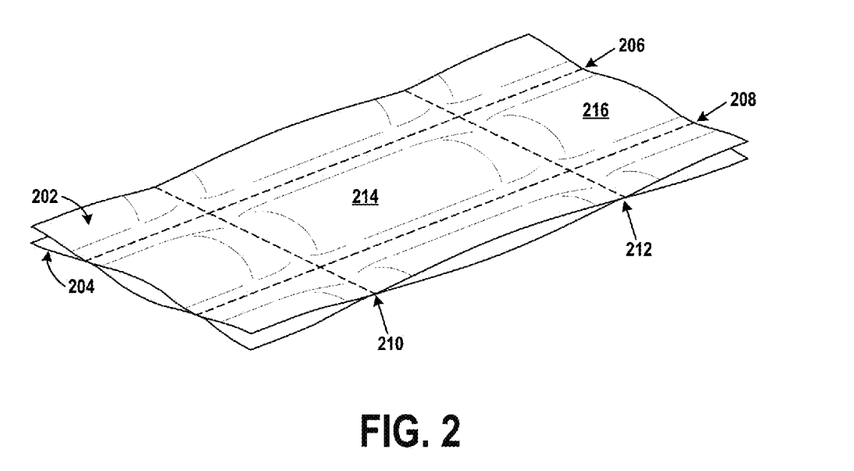
FIG. 2 illustrates a portion of seamless tubings with an example stitch pattern welded thereon.

FIG. 2 illustrates a portion of seamless tubings with an example stitch pattern welded thereon. In FIG. 2, the portion includes tubings 202 and 204 arranging intimately together, and stitch welding has been performed. The stitch pattern in FIG. 2 includes a number of parallel lines 206 and 208 run along a length of the tubings 202 and 204, and other parallel lines 210 and 212 run along a width of the tubings 202 and 204. The lines 206 and 208 are perpendicular to the lines 210 and 212. Although the lines 206, 208, 210, and 212 are shown and described as running along a length and width of the tubings 202 and 204, stitch welding may be performed in other manners so as to weld stitches, or areas along the tubings 202 and 204 with spaces between the stitches, for example.

The stitch pattern creates individual cells, such as cells 214 and 216 for example, that run a length of the material. A seam welder may be used to provide a weld pattern along a length of the tubing such as to provide the weld lines 206, 208, 210, and 212, and a different roll seam welder may be used to go around a diameter of the tubing for weld points to generate a desired cellular structure layout.

Referring back to FIG. 1, at block 106, the method 100 includes arranging a second set of concentric tubings, and at block 108, the method 100 includes circumferentially seam welding outer tubings to the pack to create a welded tube assembly. In one example, this includes placing the pack between a first outer tubing and a second outer tubing, and then circumferentially welding a perimeter of ends of the first outer tubing, the second outer tubing, and the pack (i.e., the stitch welded tubings). In one example, the pack may include the welded structure shown in FIG. 2, and two layers of material may be provided around the pack for welding.

Figure 3:
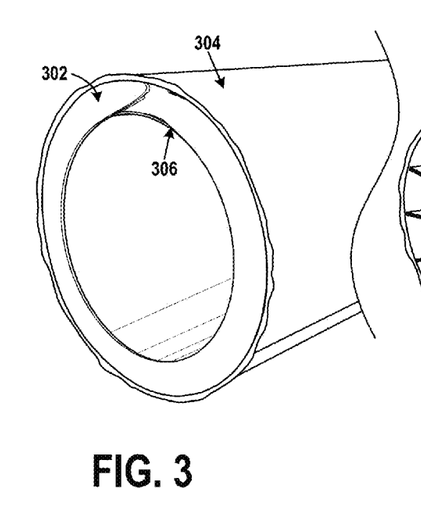
FIG. 3 illustrates a portion of an example welded tube assembly.

FIG. 3 illustrates a portion of an example welded tube assembly. In FIG. 3, a seam welder has been used to provide a perimeter weld 302 enclosing the inner two sheets that are stitch welded and shown in FIG. 2 between two outer sheets 304 and 306. The perimeter weld may be a circumferential weld on the outer sheets at an end of the sheets. In FIG. 3, the portion of the welded tube assembly is tubular or a cylindrical shape.

Figure 4:
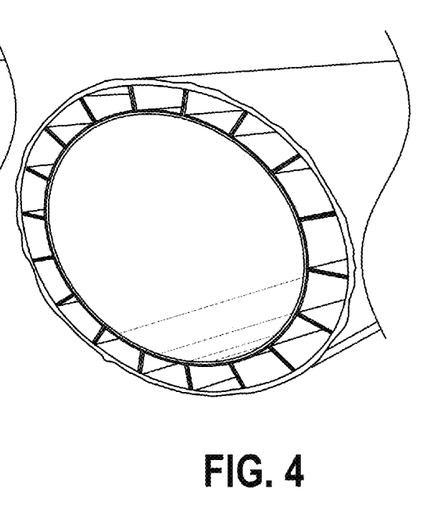
FIG. 4 illustrates a portion of another example welded tube assembly.

FIG. 4 illustrates a portion of another example welded tube assembly. In FIG. 4, the welded tube assembly is shown to be more elliptical in shape. The tube assembly may be configured to have a cross-sectional shape of other circular or ellipsoid shapes are as well.

Referring back to FIG. 1, at block 110, the method 100 includes inserting a cylinder die into the welded tube assembly, and at block 112, the method 100 includes placing the welded tube assembly into a heated die. An example die is a three piece die to hold a shape on an inside of the tubing (e.g., cylinder die form) and two outer die halves.

Figure 5:
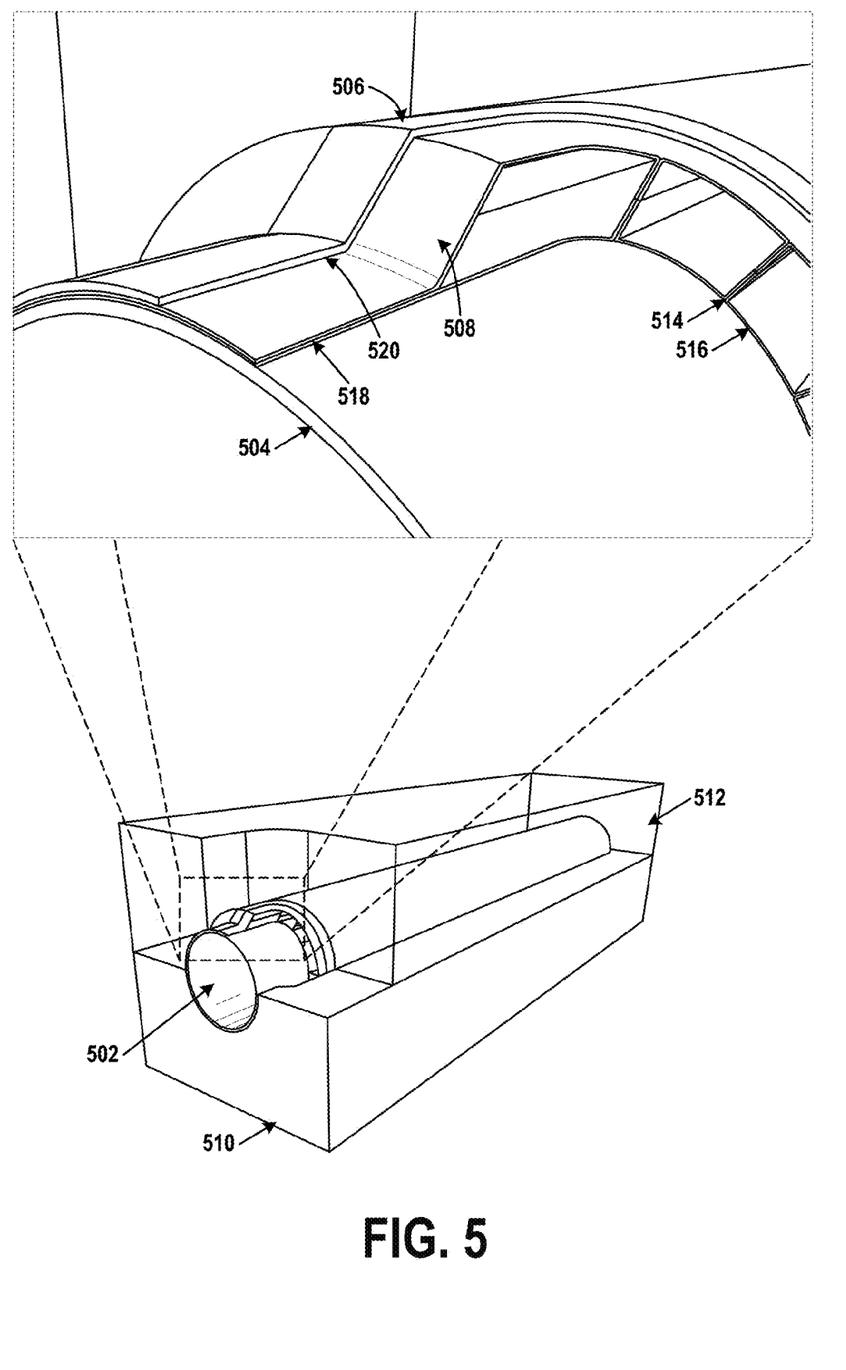
FIG. 5 illustrates an example tubing and an example die form.

FIG. 5 illustrates an example tubing and an example die form. In FIG. 5, a cylinder die 502 is inserted into the tubing, which includes layers 504 and 506 of the tubing (in which layer 504 is an inner wall of the tubing), and a stitch welded pack 508 stitch welded together. The welded tube assembly is then inserted into a lower die 510 and an upper die 512. The three piece die including cylinder die 502, the lower die 510, and the upper die 512 is used to hold the shape of the tubing during a bonding process. While FIG. 5 shows a substantially linear length of tubing with substantially constant cross section, it will be readily understood that the curvature and cross section of the tubing may be non-linear and curved, or any other configuration.

Referring back to FIG. 1, at block 114, the method 100 includes bringing the welded tube assembly up to temperature. As one example, the welded tube assembly within the die is heated to a temperature in a range of about 1450° F. to about 1850° F., or in a range of about 1500° F. to about 1700° F. degrees depending on an alloy of the materials.

At block 116, the method 100 includes pressurizing the outer tubes to fill the die, and at block 118, the method 100 includes pressurizing the inner welded tube assembly to form the inner structures according to the stitch pattern. A pressure may be applied at a pressure of about 300 psi, or other pressures to enable a diffusion bond process to occur. As an example, as shown in FIG. 5, diffusion bonds may be created within the pack 508, such as diffusion bond 514. Diffusion bonds may also occur between the layers 504 and 506 and the pack 508, such as diffusion bond 516, 518, and 520.

The pressurizing causes the layers 504 and 506 of the tubing to fill contours of the heated lower die 510 and upper die 512. Pressurizing also causes the pack 508 to form cells within the inner wall based on the stitch pattern. For example, the stitch pattern provides boundaries to enable the cells to expand. Heating and pressurizing allows the sheets to be bonded together.

Figure 6A:
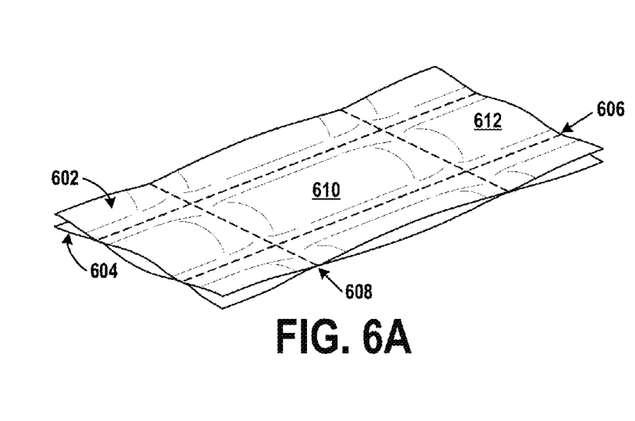
FIGS. 6A-6D illustrate examples of formation of cells within the inner walls based on the stitch pattern.
Figure 6B:
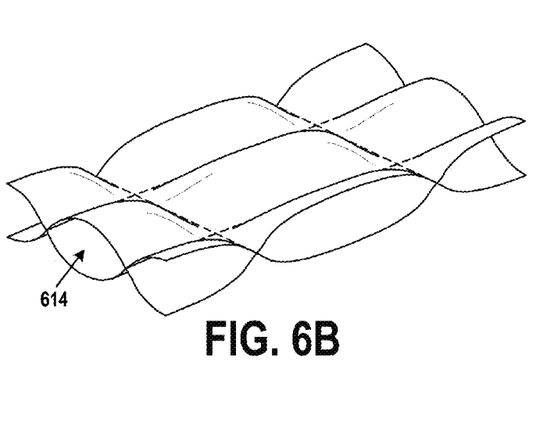
Figure 6C:
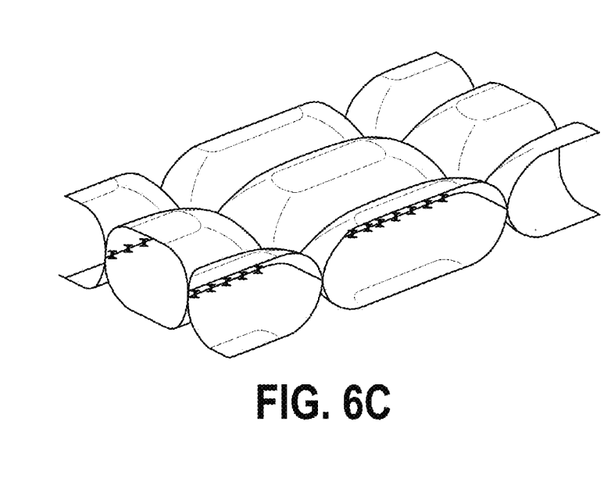
Figure 6D:
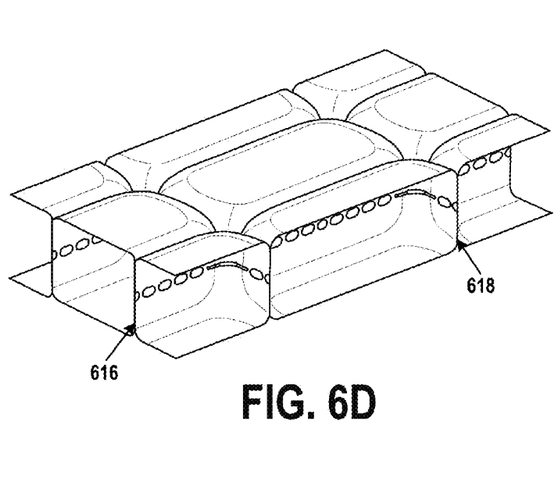

FIGS. 6A-6D illustrate examples of formation of cells within a stitch welded pack based on the stitch pattern. FIG. 6A illustrates two sheets 602 and 604 stitch welded with stitches 606 and 608 to forms cells, such as cells 610 and 612. During the heating and pressurizing process, with the sheets 602 and 604 stitched together in a quilt-like pattern, bubbles form over time. FIG. 6B shows an initial stage of bubbles forming, such as bubble 614. FIG. 6C shows a subsequent stage with the bubbles more fully formed and expanding. FIG. 6D shows an example final formation of the cells, which may be rectangles, squares, or any other shapes, and diffusion bonds have formed between the sheets, such as diffusion bonds 616 and 618.

Referring back to FIG. 1, at block 120, the method 100 includes holding pressure for a diffusion bond process between the outer wall and the inner wall. The pressure is held to enable the inner wall to diffusion bond to the outer wall. The pressure can be held for a time period, such as about three hours, to enable the outer wall and the inner wall to go through the diffusion bond process such that the outer wall and the inner wall become an integral piece. The pressure also enables full forming of the cells, or inner structures of the tubing, to form.

At block 122, the method 100 includes removing a resulting tube part from the heated die and cooling the resulting tube part.

Figure 7A:
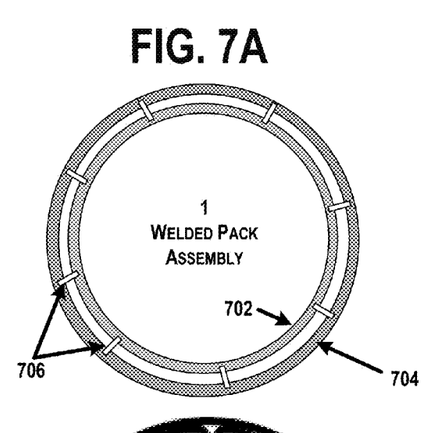
FIGS. 7A-7F illustrate another view of examples of formation of cells within a tubular structure based on a stitch pattern.
Figure 7B:
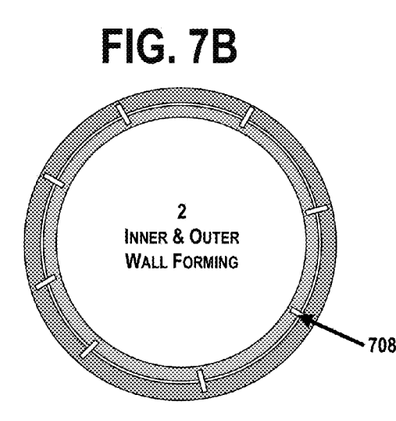
Figure 7C:
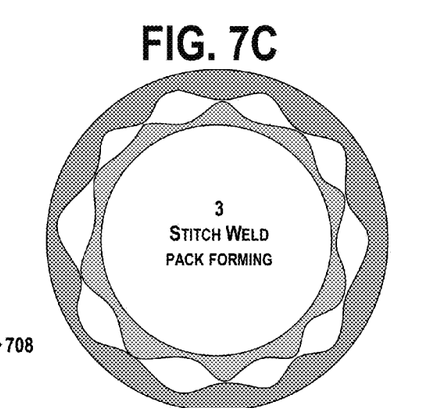
Figure 7D:
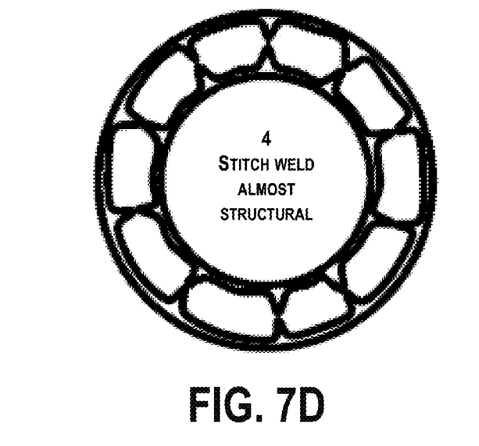
Figure 7E:
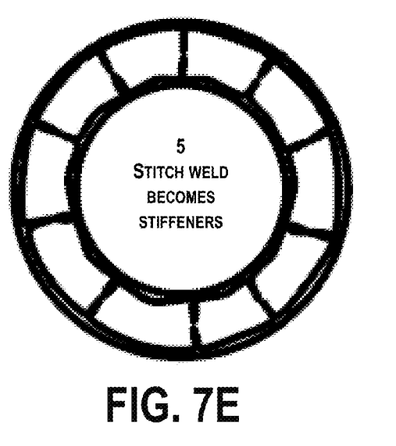
Figure 7F:
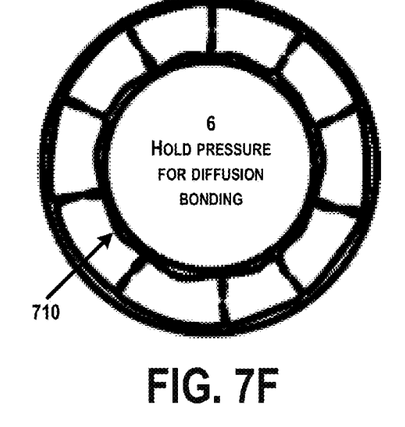

FIGS. 7A-7F illustrate another view of examples of formation of cells within a tubular structure based on a stitch pattern. In FIG. 7A, a welded pack assembly is shown including an inner wall 702, an outer wall 704, and a pack including stitch welded sheets with stitch welds, such as stitch welds 706. In FIG. 7B, the inner wall and the outer wall are bonded to the stitch pack forming a weld 708 at the stitchings. In FIG. 7C, further bonding takes place within the pack assembly and some cell formation occurs. In FIG. 7D, again, additional bonding takes place within the pack assembly, and stitch welds continue to form cells. In FIG. 7E, the stitch welds become stiffeners, and cell formation is complete. In FIG. 7F, diffusion bonding occurs by holding at pressure resulting in diffusion bonds (e.g., bond 710).

Figure 8:
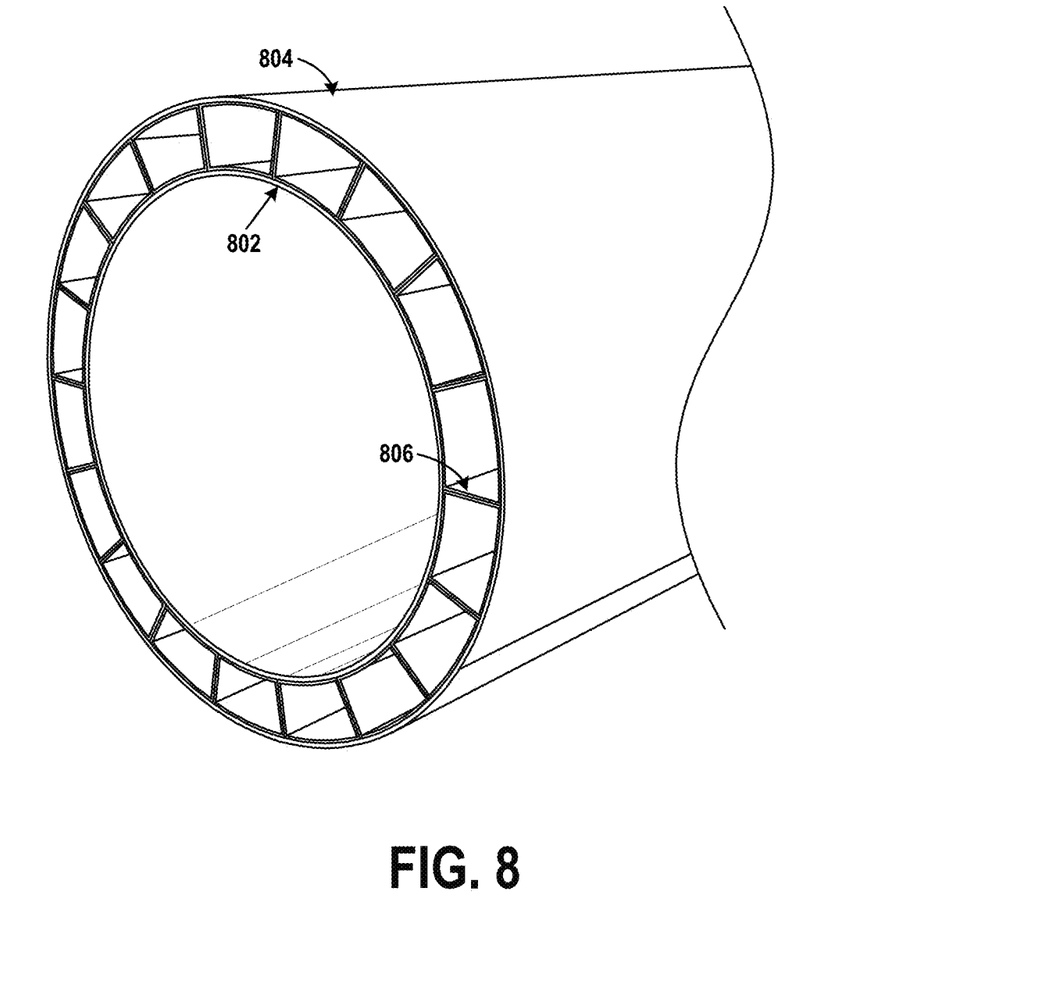
FIG. 8 illustrates an example resulting tube part.

FIG. 8 illustrates an example resulting tube part. As shown, the tube may be a double-walled titanium tube structure that includes an inner wall 802 and an outer wall 804 with a plurality of stiffeners, such as stiffener 806, extending between the inner wall 802 to the outer wall 804. The plurality of stiffeners are aligned both axially and radially, and the plurality of stiffeners are diffusion bonded to the inner wall 802 and the outer wall 804.

The double-walled titanium tube structure shown in FIG. 8 may be a unitary tube with no fasteners resulting from multiple concentric tubes of titanium resistance welded prior to die forming at temperature and pressure. The plurality of stiffeners provide a continuous internal load path for the tube for greater strength. The annulus of the tube can be used for insulative purposes for corrosion resistant or heat resistant applications. The annulus with a specific stitch pattern can also accommodate a parallel or counter flow in any configuration of air or fluids.

The method 100 shown in FIG. 1 may be performed to manufacture a number or variety of types of double-walled conduits or tube structures. One example includes a seamless, open annulus, heated press process, as shown and described. Another example includes a seamless, closed annulus, heated press process following stitch welding, spot or circumferential welding can be performed for radial spacing. Yet another example includes a rolled tube, open annulus, heated press process, in which the sheets are rolled into tubing, and friction stir welded to ensure SPF properties. Still another example includes a rolled tube, closed annulus, heated press process in which both spot or circumferential welding and friction stir welding are performed.

Figure 9:
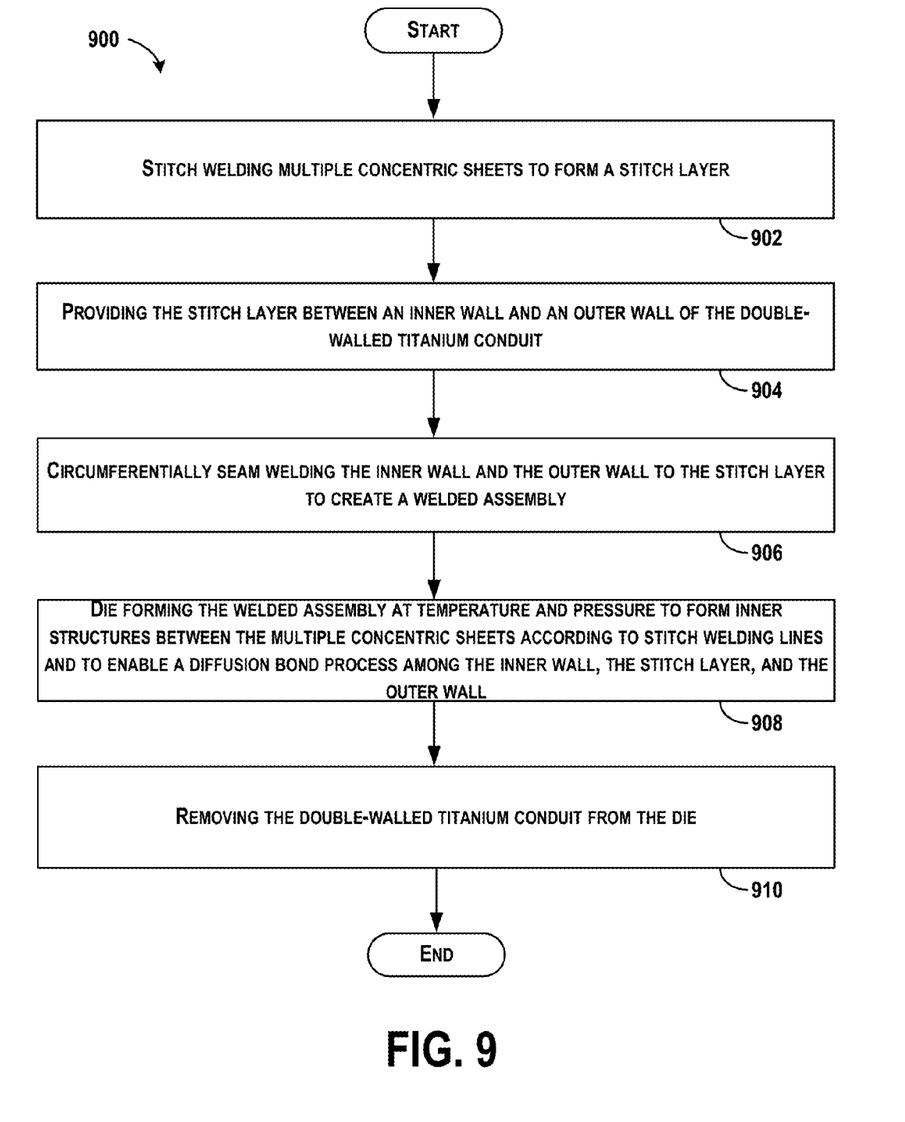
FIG. 9 is a flowchart that describes another example method of manufacturing a double-walled titanium conduit.

FIG. 9 is a flowchart that describes another example method 900 of manufacturing a double-walled titanium conduit. The method 900 may include one or more operations, functions, or actions as illustrated by one or more of blocks 902-910. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 902, the method 900 includes stitch welding multiple concentric sheets to form a stitch layer. In some examples, stitch welding creates a pattern on the multiple concentric sheets that form a size and shape of the inner structures. The inner structures can include at least one stiffener extending between outer sheets of an outer wall of the conduit.

At block 904, the method 900 includes providing the stitch layer between an inner wall and an outer wall of the double-walled titanium conduit. A specific stitch welding pattern may be chosen based on an application of the conduit for creation of a pathway or creation of cells between the inner wall and the outer wall.

At block 906, the method 900 includes circumferentially seam welding the inner wall and the outer wall to the stitch layer to create a welded assembly. The welded assembly is now in a tubular shape and configuration.

At block 908, the method 900 includes die forming the welded assembly at temperature and pressure to form inner structures between the multiple concentric sheets according to stitch welding lines and to enable a diffusion bond process among the inner wall, the stitch layer, and the outer wall. A shape and configuration of dies can be chosen based on an application of the conduit. Pressure and temperature are applied for the diffusion bonding process to occur such as at 300 psi and 1450° F. for about 3 hours.

At block 910, the method 900 includes removing the double-walled titanium conduit from the die. Within examples, the double-walled titanium conduit is a tubular structure. In other examples, the double-walled titanium conduit is an ellipsoid structure.

Using examples described herein, a titanium (or other alloy) double-walled tube can be manufactured that is corrosion resistant, heat resistant, and structurally reinforced with increased cross section for greater strength to provide a fail safety for a titanium tube. Example uses include tubing for transport elements or structural applications in extreme environments, such as oil industry or aerospace, for example.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of manufacturing a double-walled titanium conduit, comprising:
    stitch welding multiple sheets concentrically to form a stitch layer;
    providing the stitch layer between an inner wall and an outer wall of the double-walled titanium conduit;
    circumferentially seam welding the inner wall and the outer wall to the stitch layer to create a welded assembly;
    die forming the welded assembly at a temperature and pressure to form inner structures between the multiple concentric sheets according to stitch welding lines and to enable a diffusion bond process among the inner wall, the stitch layer, and the outer wall; and
    removing the double-walled titanium conduit from the die.

2. The method of claim 1, wherein the inner structures comprise at least one stiffener extending between the inner wall and the outer wall.

3. The method of claim 1, wherein stitch welding creates a pattern on the multiple sheets that form a size and shape of the inner structures.

4. The method of claim 1, wherein the double-walled titanium conduit is a tubular structure.

5. The method of claim 1, wherein the double-walled titanium conduit has an elliptical shape.

6. A method of manufacturing a double-walled tube, comprising:
    super plastically forming inner structures of the double-walled tube; and
    diffusion bonding an outer wall, an inner wall, and the inner structures of the double-walled tube, the super plastically forming and diffusion bonding further comprising:
        arranging substantially intimately concentric seamless tubings;
        stitch welding the seamless tubings with a rolled tubing seam welder to create a stitch layer including a stitch pattern;

circumferentially seam welding concentric outer sheets of the outer wall to the inner wall and the stitch layer to create a welded tube assembly;

inserting a cylinder die into the welded tube assembly;

placing the welded tube assembly into a heated die;

bringing the welded tube assembly up to temperature;

pressurizing the welded tube assembly to form the inner structures according to the stitch pattern;

holding pressure for a diffusion bond process between the outer wall and the inner wall; and removing a resulting tube part from the heated die and cooling the resulting tube part.

7. The method of claim 6, wherein the concentric seamless tubings have approximately matching diameters to enable contact during stitch welding.

8. The method of claim 6, further comprising cleaning the seamless tubings to remove oxidation.

9. The method of claim 6, wherein stitch welding the seamless tubings comprises creating the stitch pattern along a length of the seamless tubings.

10. The method of claim 6, wherein circumferentially seam welding outer sheets of the outer wall to the inner wall and the stitch layer comprises:

placing the inner wall between a first outer sheet and a second outer sheet; and circumferentially welding a perimeter of ends of the first outer sheet, the second outer sheet, and the inner wall.

11. The method of claim 6, wherein placing the welded tube assembly into the heated die comprises placing the welded tube assembly into a lower die and an upper die.

12. The method of claim 6, wherein bringing the welded tube assembly up to temperature comprises heating the welded tube assembly to a temperature in the range of about 1450° F. to about 1850° F.

13. The method of claim 6, wherein pressurizing the welded tube assembly to form the inner structures comprises:

causing the outer sheets to fill contours of the heated die; and pressurizing the seamless tubings of the inner wall to form cells within the inner wall based on the stitch pattern.

14. The method of claim 6, wherein pressurizing the welded tube assembly to form the inner structures comprises pressurizing at a pressure of about 300 psi.

15. The method of claim 6, wherein holding pressure for the diffusion bond process between the outer wall and the inner wall comprises holding pressure for a time period to enable the outer wall and the inner wall to go through the diffusion bond process such that the outer wall and the inner wall become an integral piece.

16. The method of claim 1, wherein stitch welding the multiple sheets comprises creating a pattern along a length of the multiple sheets.

17. The method of claim 1, wherein die forming the welded assembly at the temperature and pressure to form inner structures between the multiple concentric sheets comprises:

bringing the welded assembly up to a temperature in the range of about 1450° F. to about 1850° F.

18. The method of claim 1, wherein die forming the welded assembly at the temperature and pressure to form inner structures between the multiple concentric sheets comprises:

pressurizing the welded assembly at a pressure of about 300 psi.

19. The method of claim 1, further comprising holding the pressure for the diffusion bond process between the inner wall, the stitch layer, and the outer wall for a time period to enable the outer wall and the inner wall to go through the diffusion bond process such that the outer wall and the inner wall become an integral piece.

20. The method of claim 6, wherein the double-walled tube is a double-walled titanium conduit.

* * * * *